United States Patent
Bruck et al.

(10) Patent No.: US 9,458,728 B2
(45) Date of Patent: Oct. 4, 2016

(54) METHOD FOR FORMING THREE-DIMENSIONAL ANCHORING STRUCTURES ON A SURFACE BY PROPAGATING ENERGY THROUGH A MULTI-CORE FIBER

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 540 days.

(21) Appl. No.: 14/017,339

(22) Filed: Sep. 4, 2013

(65) Prior Publication Data

US 2015/0369064 A1 Dec. 24, 2015

(51) Int. Cl.
*B23K 26/00* (2014.01)
*F01D 5/32* (2006.01)
(Continued)

(52) U.S. Cl.
CPC .............. *F01D 5/326* (2013.01); *B23K 20/10* (2013.01); *B23K 26/0006* (2013.01); *B23K 26/0078* (2013.01); *B23K 26/0081* (2013.01); *B23K 26/0084* (2013.01); *B23K 26/0608* (2013.01); *B23K 26/0613* (2013.01); *B23K 26/0622* (2015.10); *B23K 26/08* (2013.01); *B23K 26/082* (2015.10); *B23K 26/126* (2013.01);
(Continued)

(58) Field of Classification Search
CPC ............ B23K 20/10; B23K 2201/001; B23K 2203/02; B23K 2203/172; B23K 2203/50; B23K 2203/52; B23K 26/0006; B23K 26/0078; B23K 26/0081; B23K 26/0084; B23K 26/0608; B23K 26/0613; B23K 26/0622; B23K 26/08; B23K 26/082; B23K 26/1224; B23K 26/123; B23K 26/126; F01D 5/282; F01D 5/288; F01D 5/326; F01D 9/02; F05D 2220/32; F05D 2230/13; F05D 2230/90
USPC .......................................... 219/121.6–121.86
See application file for complete search history.

(56) References Cited

U.S. PATENT DOCUMENTS 4,299,860 A 11/1981 Schaefer et al.
4,532,400 A 7/1985 Toida et al.
(Continued)

FOREIGN PATENT DOCUMENTS

DE 102010003750 A1 10/2011
DE 102011113246 A1 3/2013

OTHER PUBLICATIONS

English Translation of DE 10 2011 113 246 Mar. 2013.*
(Continued)

*Primary Examiner* — Sang Y Paik

(57) ABSTRACT

A method for forming three-dimensional anchoring structures on a surface is provided. This method may result in a thermal barrier coating system exhibiting enhanced adherence for its constituent coatings. The method involves applying a first laser beam (20) through a first portion (7) of a multi-core fiber (4) to a surface (12) of a solid material (14) to form a liquefied bed (16) on the surface (12) of the solid material (14), then applying a pulse of laser energy (24) through a second portion (6) of the multi-core fiber (4) to a portion of the liquefied bed (16) to cause a disturbance, such as a splash (28) of liquefied material outside the liquefied bed (16). A three-dimensional anchoring structure (30) may thus be formed on the surface (12) upon solidification of the splash (28) of the liquefied material.

20 Claims, 2 Drawing Sheets

(51) Int. Cl.
  *B23K 26/06*  (2014.01)
  *B23K 26/08*  (2014.01)
  *F01D 5/28*   (2006.01)
  *B23K 20/10*  (2006.01)
  *F01D 9/02*   (2006.01)
  *B23K 26/12*  (2014.01)

(52) U.S. Cl.
  CPC .......... *B23K26/1224* (2015.10); *F01D 5/282* (2013.01); *F01D 5/288* (2013.01); *F01D 9/02* (2013.01); *B23K 26/123* (2013.01); *B23K 2201/001* (2013.01); *B23K 2203/02* (2013.01); *B23K 2203/172* (2015.10); *B23K 2203/50* (2015.10); *B23K 2203/52* (2015.10); *F05D 2220/32* (2013.01); *F05D 2230/13* (2013.01); *F05D 2230/90* (2013.01)

(56) References Cited

U.S. PATENT DOCUMENTS

| | | | |
|---|---|---|---|
| 4,550,240 A | 10/1985 | Toida et al. | |
| 4,789,770 A | 12/1988 | Kasner et al. | |
| 4,884,820 A | 12/1989 | Jackson et al. | |
| 5,419,971 A | 5/1995 | Skelly et al. | |
| 5,566,196 A | 10/1996 | Scifres | |
| 5,723,078 A | 3/1998 | Nagaraj et al. | |
| 5,759,640 A | 6/1998 | Mannava et al. | |
| 5,866,271 A | 2/1999 | Stueber et al. | |
| 5,948,286 A * | 9/1999 | Chalco | B23K 26/06 219/121.63 |
| 6,074,706 A | 6/2000 | Beverley et al. | |
| 6,471,881 B1 | 10/2002 | Chai et al. | |
| 7,094,450 B2 | 8/2006 | Nagaraj et al. | |
| 7,661,387 B2 | 2/2010 | Poullos | |
| 8,440,581 B2 | 5/2013 | Im et al. | |
| 2004/0081760 A1 | 4/2004 | Burns et al. | |
| 2005/0266163 A1* | 12/2005 | Wortman | C23C 4/02 427/248.1 |
| 2010/0116801 A1* | 5/2010 | Mukai | B08B 7/0042 219/121.85 |
| 2012/0261459 A1* | 10/2012 | Bruck | B23K 35/327 228/178 |
| 2013/0078423 A1 | 3/2013 | Sutou et al. | |
| 2013/0105807 A1 | 5/2013 | Im et al. | |
| 2013/0142965 A1* | 6/2013 | Bruck | C23C 24/106 427/597 |

OTHER PUBLICATIONS

English Translation of DE 10 2010 003 750 Oct. 2011.*

Latif et al., "Microstructural Morphological Changes in Laser Irradiated Platinum", Journal of Modern Physics, 2011, 2, pp. 875-884, doi: 10.4236/jmp.2011.28104 Published Online Aug. 2011, Pakistan.

Leitz,, "Metal Ablation with Short and Ultrashort Laser Pulses", ScienceDirect, Physics Procedia 12 (2011), pp. 230-238, Erlangen, Germany.

* cited by examiner

METHOD FOR FORMING THREE-DIMENSIONAL ANCHORING STRUCTURES ON A SURFACE BY PROPAGATING ENERGY THROUGH A MULTI-CORE FIBER

FIELD OF THE INVENTION

Aspects of the present invention relate to thermal barrier coating systems for components exposed to high temperatures, such as encountered in the environment of a combustion turbine engine. More particularly, aspects of the present invention are directed to techniques that involve laser irradiation from at least two laser beams propagating through a multi-core fiber that form three-dimensional anchoring structures on a surface. These anchoring structures provide enhanced adhesion for a thermal barrier coating system applied over the surface.

BACKGROUND OF THE INVENTION

It is known that the efficiency of a combustion turbine engine improves as the combustion gas firing temperature increases. However, as the firing temperature increases the high temperature durability of turbine components must be correspondingly increase. Although nickel and cobalt based superalloy materials may be used for components in the hot gas flow path, such as combustor transition pieces and turbine rotating blades and stationary vanes, even these superalloy materials are not capable of surviving long-term operation at temperatures that sometimes exceed 1,400 degrees C.

In many applications a metal substrate (e.g., of a component) or a bond coating overlying the metal substrate is coated with a ceramic insulating material, such as a thermal barrier coating (TBC), to reduce the operating temperature of the metal substrate and the magnitude of the temperature transients to which the metal is exposed.

TBCs have played a significant role in reducing the operating temperature of turbine components and in realizing improvements in turbine efficiency. Obviously the thermal barrier coating protects the substrate only while the coating remains substantially intact on the substrate surface.

During operation, the TBCs and any underlying bond coatings are subject to spallation and degradation. The cause of such distresses may include: high physical stresses caused by high-velocity ballistic impacts by foreign objects, differential thermal expansion (i.e., between the underlying superalloy substrate and overlying bond coating or between the bond coating and the TBCs), material defects, and material property changes due to the operating environment. Any of these situations can lead to damage and even total removal of the bond coating and/or the TBC from the substrate surface. The conventional repair process involves stripping the damaged layer(s) and recoating the substrate, a time-consuming and costly task.

It is known to control a roughness parameter of a surface (such as the substrate surface) to improve adhesion of an overlying bonding layer or a thermal barrier coating. U.S. Pat. No. 5,419,971 describes a laser ablation process where removal of material by direct vaporization (e.g., without melting the material) is purportedly used to form three-dimensional features at the irradiated surface. See col. 6, line 3. These features are limited to patterns formed within the irradiated surface. These laser ablation processes do not form structures extending beyond the surface. Thus processes that can provide improved structural formations conducive to enhanced adhesion are needed.

BRIEF DESCRIPTION OF THE DRAWINGS

The invention is explained in the following description in view of the drawings that show.

DETAILED DESCRIPTION OF THE INVENTION

Figure 1:
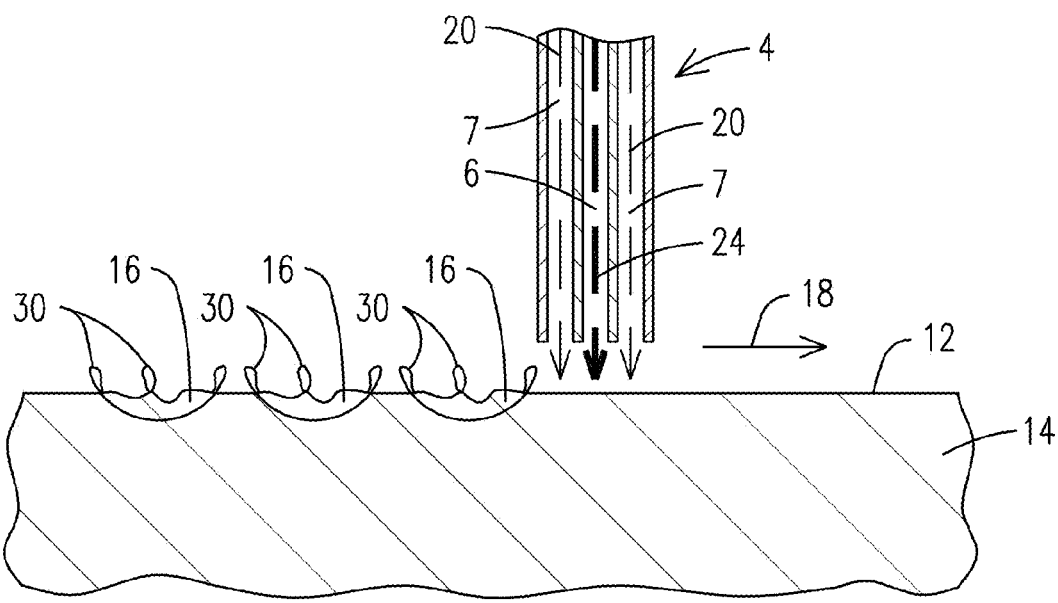
FIG. 1 is a cross sectional view of a solid material being irradiated with laser irradiation in accordance with aspects of the present invention.

In accordance with one or more embodiments of the present invention, structural arrangements and/or techniques conducive to formation of three-dimensional anchoring structures (commonly referred to as mechanical hooks, fingers or waves) on a surface exposed to laser irradiation from a multi-core laser fiber are described herein. In one application, the mechanical hooks improve the adherence of bond coatings and TBCs on gas turbine blades and vanes, and may also extend the duration of an effective TBC. The techniques of the invention can be used during manufacture of the blades and vanes and also during repair. In either case, the operating life of the blades and vanes is extended.

The inventors of the present invention propose innovative utilization of laser irradiation from a multi-core laser fiber to form three-dimensional anchoring structures on a surface of a substrate or of a bond coating. A multi-core coaxial fiber 4 is illustrated in an axial cross-sectional view of FIG. 1, as comprising an inner core 6 and an outer annulus 7. According to one embodiment, a relatively higher power laser propagates in the inner core 6 and a relatively lower power laser propagates in the outer annulus 7. Upon exiting the fiber 4, both laser beams strike a surface 12 of a solid material or substrate 14.

In one embodiment, an outer laser beam 20 (pulsed or continuous) propagating through the outer annulus 7 comprises a relatively low power density relatively large diameter beam that produces a melt 16 (also referred to as a liquefied bed) as illustrated in FIG. 1. A plurality or series of such melts 16 are formed on the surface 12 as the optical components and the substrate 14 move relative to each other, as indicated by an arrowhead 18.

An inner, pulsed laser beam 24 carried by the inner core 6 exhibits a relatively high power density and a narrower beam diameter than the outer laser beam 20. The inner laser beam 24 is focused onto a least a region of the melt 16 to create a disturbance in the melt 16. For example, illuminating the melt 16 with the inner laser beam 24 before the melt solidifies creates a splash of liquefied melt material. This splash may be formed outside and/or above the melt 16. When the splash solidifies anchoring surface features or structures 30 (e.g., hook-like, anchor-like or finger-like structures) are formed. These structures serve as anchors that mechanically improve adhesion of a subsequently applied TBC or bond coating layer over the surface 12 of the substrate 14.

Generally, the melt may be on the order of about 1 to 4 mm in diameter or width, with the splash and the anchoring structures extending above and outboard of the melt by about 10 to 30 percent of the melt diameter.

Such multi-core coaxial laser fibers 4 and associated core switching devices for use with the present invention are available from various laser manufacturers, e.g., Trumpf, Inc. of Farmington, Conn. These multi-core laser fibers have been used for alternating, but not simultaneous processes, such as cutting material with a laser propagating through a 100 micron diameter core and then welding material with a laser propagating through a 400 or 600 micron diameter annulus.

Figure 2:
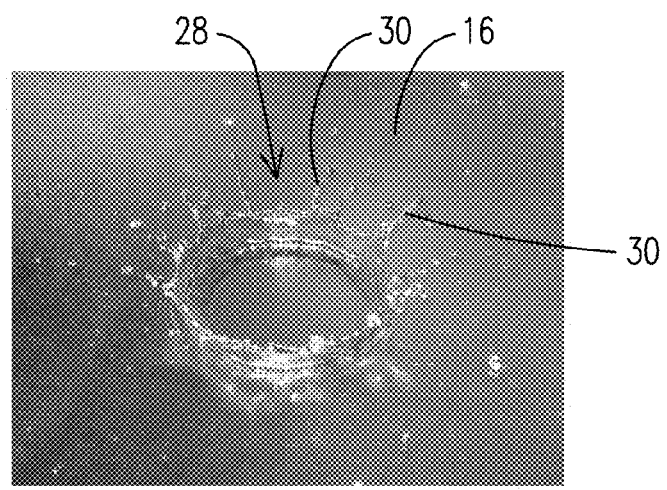
FIG. 2 is an isometric view of an exemplary splash of liquefied material which, in accordance with aspects of the present invention, forms three-dimensional anchoring structures above the surface of the solid material upon solidification of the material splash.

FIG. 2 illustrates a solidified splash 28 comprising three-dimensional hook-like anchoring structures 30 outboard of the liquefied bed 16.

Figure 3:
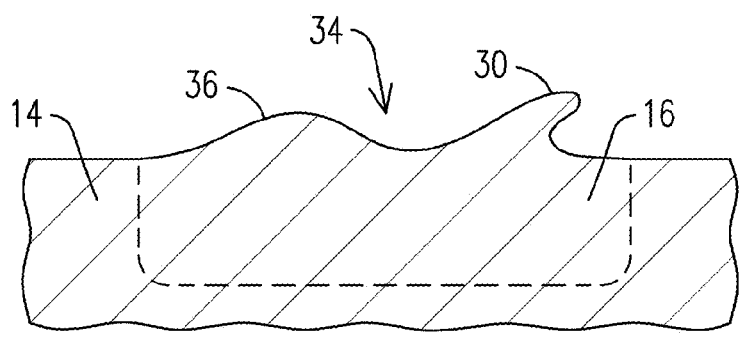
FIG. 3 is a partial cross-sectional view of a non-limiting example of anchoring structures such as an undulation, wave, finger, or hook formed above the surface of the solid material.

FIG. 3 illustrates a solidified splash 34 having different features than the solidified splash 28 of FIG. 2. In particular, the splash 34 comprises a wave-like anchoring structure 36 in addition to the finger-like anchoring structure 30.

Generally hook-like and finger-like anchoring structures have similar structural features. Wave-like anchoring structures tend to exhibit smoother surface features that do not necessarily provide the same mechanical advantage afforded by hooks/fingers. Though waves increase the attachment surface area and can therefore resist some lateral shear forces exerted on the TBC or bond coating. Due to the better adhesion properties, hooks/fingers are typically preferred over waves.

The formation of waves or hook/finger anchoring structures is generally a function of the amount and timing of the laser energy applied to the melt. Forming hooks/fingers generally requires additional energy than forming waves.

According to one embodiment, the outer laser beam 20 may be controllably defocused or power-controlled to cause the melt 16 to extend only to a desired depth, such as an exemplary depth of about 0.3 mm, into the substrate or bond coating layer.

The inner laser beam 24 may be a focused pulse having a sufficiently high power density to form a disruption in the melt 16, such as the anchoring structures 30 of FIG. 2 or the wave 36 of FIG. 3. Formation of the disruption may be due to localized flash evaporation of the melt material.

In one non-limiting embodiment, a typical energy density for general, broad area melting (i.e., to form the melt 16 by the outer laser beam 20) may range from approximately 3 kJ/cm² to approximately 10 kJ/cm².

For disruption of the melt 16 to create the hook-like anchoring structures 30 pulses of focused energy may be employed. In one non-limiting embodiment, such pulses may comprise parameters having respective ranges typical of laser ablation processing. Karl-Heinz Leitz et al. in a paper entitled "Metal Ablation with Short and Ultrashort Laser Pulses", published in Physics Procedia, Vol. 12, 2011, pages 230-238, has summarized such ranges in parameters as follows:

| Pulse | Applied Power | Pulse Energy | Focus Radius | Peak Fluence |
|---|---|---|---|---|
| 80 micro-s | 44 w | 90 milli-J | 200 micro-m | 140 J/cm² |
| 60 nano-s | 34 w | 280 micro-J | 20 micro-m | 45 J/cm² |
| 10 pico-s | 7.5 w | 150 micro-J | 40 micro-m | 6 J/cm² |
| 170 femto-s | 300 milli-w | 300 micro-J | 30 micro-m | 23 J/cm² |

The disruption (e.g., splash) of liquefied material formed in the liquefied bed 16 can also be generated by an energy pulse other than laser energy, such as sonic energy, ultrasonic energy, mechanical energy (e.g., a puff of air, a solid object), etc.

According to another embodiment, a laser propagates through an annular region of a fiber and sonic, ultrasonic, or mechanical energy is carried through a hollow core. In one embodiment an outside diameter of fiber is about 600 micron, for example, and the hollow core has a diameter of about 200 micron, for example.

The laser energy produces the melt 16. In one embodiment a wire, e.g. 190 micron diameter wire, made of high melting point material (such as carbon) is incrementally inserted through the core and into the melt 16 to create a splash or disruption in the melt 16.

Alternatively, other forms of mechanical energy can be carried through the hollow core, such as a burst of air, sonic energy or ultrasonic energy.

The various described foregoing processes may be iteratively performed throughout the surface 12 to form a large number of three-dimensional anchoring structures 30 thereon. Moreover, three-dimensional anchoring structures 30 may be selectively distributed throughout surface 12. For example, surface regions expected to encounter a relatively large level of stress may be engineered to include a larger number of three-dimensional anchoring structures 30 per unit area compared with surface regions expected to encounter a relatively lower level of stress.

Additionally, to form anchoring structures 30 in selected region(s) of the melt 16, the pulse of laser energy 24 is focused onto those selected region(s).

In one non-limiting embodiment, the laser beams 20 and 24 may be applied to the surface 12 of the substrate 14 by use of a beam-scanning technique (e.g., two-dimensional scanning) of the laser beams 20 and 24. This beam scanning can progress not only in the direction designated by the arrowhead 18 in FIG. 1, but also in a direction perpendicular to the arrowhead 18 along the surface 12.

In addition to movement of the multi-core coaxial fiber 4 (and therefore the laser beams 20 and 24) over a stationary substrate, alternatively the substrate 12 can be moved relative to a stationary fiber and the laser beams that propagate through the fiber. Thus during the scanning process either the fiber 4 or the substrate 12 is moved relative to the other.

In an alternative embodiment the pulse of laser energy 24 (i.e., the inner laser beam) that causes the splash may be interspersedly applied during application of the outer laser beam 20 (i.e., that forms the melt) to the surface 12. For example, at a certain time during application of the inner laser beam 20, the pulse of laser energy 24 may be focused onto a given spot of the liquefied bed 16 to cause a splash at the given spot and thus form the three-dimensional anchoring structure 30 upon solidification of the splash.

Alternatively, the inner laser beam 24 may be energized immediately prior to or after deactivation of the outer laser beam 20. For example, in one embodiment a time interval between deactivating the outer laser beam 20 (to form the melt) and energizing the inner laser beam 24 (to form the splash) may be a fraction of a second, e.g., 0.5 seconds.

The processes described herein may be applied continuously across the surface 12 by transiting laser beam 20 across the surface (or relative movement there between) to form a continuously moving melt pool 16, with the pulsed energy 24 being repeatedly applied proximate the moving trailing edge of the melt pool 16 just before the material re-solidifies. This process is effective to create a plurality of anchoring structures across the surface as the surface re-solidifies.

One skilled in the art will appreciate that the laser beams 20 and 24 may be controlled (e.g., power and focal point) to achieve a desired pool depth and desired dimensions of the anchoring structures 30.

It is contemplated that one may control environmental conditions of the method using a suitable enclosure while performing the foregoing laser irradiation processes. For example, depending on the needs of a given application, one may choose to perform the laser irradiation process under vacuum conditions in lieu of atmospheric pressure, or one may choose to introduce an inert gas or a reactive gas in lieu of air into the environment.

Fluxes represent still another alternative to use of inert shielding gas. The flux can be applied to the surface 12 prior to activation of the laser beams 20 and 24. The melted flux adheres to the splashed material to protect the anchoring structures 30 against environmental contaminants as they cool and solidify. The flux is then removed by any of the well-known techniques, such as by a mechanical brushing process, grit blasting, etc.

In one non-limiting application, a method embodying aspects of the present invention may be used to construct (or to repair) a thermal barrier coating system that provides thermal protection of a component 42 (FIG. 4) (e.g., a blade, a vane, etc.) operating in the high-temperature environment of a gas turbine engine. The component 42 may comprise a metal substrate 44 (e.g., a superalloy) covered by a barrier coating such as a layer of a ceramic thermal barrier coating (TBC) 46 for use in the high temperature environment of the turbine engine.

As would be readily appreciated by one skilled in the art of TBC coatings, a bond coat 48 (e.g., a MCrAlY material) may be deposited on the substrate 44 prior to the application of the TBC 46 to improve adhesion of the TBC 46 to the substrate 44.

Figure 4:
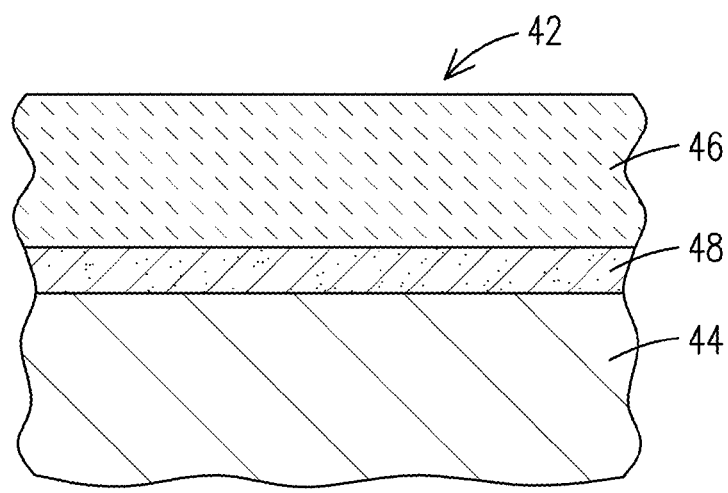
FIG. 4 is a partial cross-sectional view of an example gas turbine component including a thermal barrier coating system that may benefit from a method embodying aspects of the present invention.

It will be appreciated that aspects of the present invention are not limited to the example coating arrangement shown in FIG. 4 nor are such aspects limited to components having a TBC coating or a bond coating.

In one non-limiting application, the surface of the solid material subjected to laser irradiation to form three-dimensional anchoring structures on its surface may be the metal substrate 44. Upon formation of such three-dimensional anchoring structures, one may then deposit the bond coating layer 48 on the surface of the metal substrate 44 that includes the three-dimensional anchoring structures. Thus, in this application, the bond coating may be anchored by three-dimensional anchoring structures (e.g., superalloy anchors), which would be metallurgically integral with the substrate 44.

In another non-limiting application, with reference to FIG. 1, the surface 12 of the substrate 14 may comprise the bond coating. Upon formation of three-dimensional anchoring structures, one may then deposit a layer of the TBC 46 (see FIG. 4) on the surface of the bond coating including the three-dimensional anchoring structures. Thus, in this application, the TBC 46 may be anchored by three-dimensional anchoring structures (e.g., bond-coating anchors), which would be metallurgically integral with the bond coating 46.

In yet another non-limiting application, the respective surfaces of the metal substrate and then the bond coating may be subjected to respective laser irradiation to form three-dimensional anchoring structures on both such surfaces. For example, the surface of the metal substrate 44 may be first subjected to laser irradiation to form three-dimensional anchoring structures on its surface. A bond coating layer 48 is then deposited on the surface of the metal substrate 44 that includes the three-dimensional anchoring structures. One may then subject the surface of the bond coating 48 to a laser irradiation to form three-dimensional anchoring structures on its surface, typically not directly on top of the anchoring structures formed in the metal substrate 44. Lastly, one may then deposit a layer of the TBC 46 on the surface of the bond coating including the three-dimensional anchoring structures. Thus, in this application, the bond coating may be anchored by three-dimensional anchoring structures (e.g., superalloy anchors), which are metallurgically integral with the substrate 44. Additionally, TBC 46 would be anchored by three-dimensional anchoring structures (e.g., bond coating anchors), which are metallurgically integral with the bond coating 48.

Figure 5:
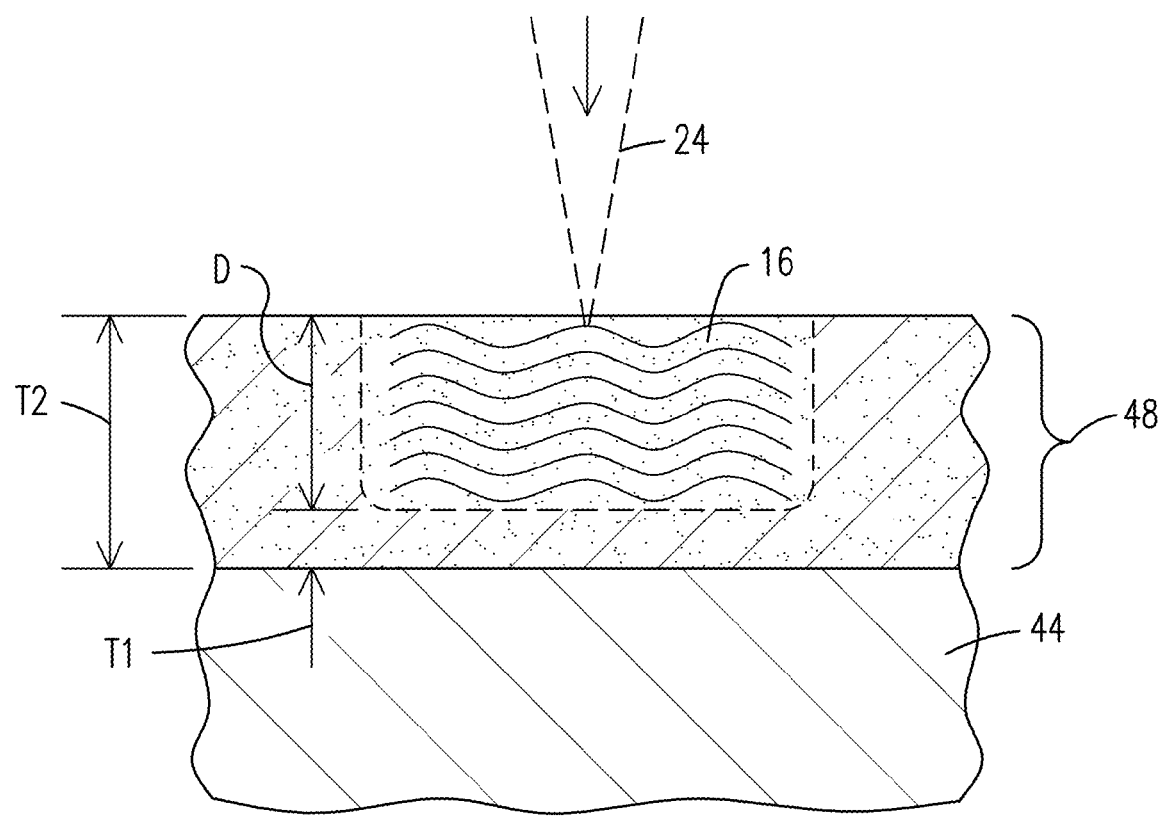
FIG. 5 is a partial cross-sectional view of a thermal barrier coating system where a bond coating surface may be subjected to laser irradiation in accordance with further aspects of the present invention.

In one non-limiting embodiment, as illustrated in FIG. 5, presuming the surface of the solid material being subjected to laser irradiation to form three-dimensional anchoring structures on its surface is the bond coating 48, it may be desirable to control a depth (D) of the liquefied bed 16 so that liquefied bed 16 does not extend into substrate 44. For example, a region T1 of solid bond coating 48 (e.g., unmelted layer of bond coating 48) remains between the bottom surface of liquefied bed 16 and the boundary with substrate 44. In one non-limiting embodiment, the thickness (T2) of bond coating 48 may range from approximately 150 micrometers to approximately 300 micrometers and the unmelted region T1 may range from approximately 10% to approximately 50% of thickness T2.

In different applications, the melt size can be increased or decreased as desired by the use of corresponding larger or smaller sized fibers and/or higher or lower power lasers. Larger or smaller anchor features with selective spacing of the fingers or hooks may be formed by the use of higher or lower power density lasers and/or larger or smaller diameter fibers.

Although described in the context of a dual fiber, according to another embodiment more than two propagation media can be used, e.g., a triple core fiber. Also, such separated beams can be provided by a composite fiber that is incident upon segmented mirrors to produce different beams for distinct functions, including, for example, less intense heating for superficial melting and more intense heating for surface disruption.

Typical superalloys for use in the preferred embodiment of surface modification include, but are not limited to, CM 247, Rene 80, Rene 142, Rene N5, Inconel-718, X750, 738, 792, and 939, PWA 1483 and 1484, C263, ECY 768, CMSX-4 and X45.

Various laser types for use with the present invention include, but are not limited to, NdYAG, ytterbium fiber, and laser diodes.

According to one embodiment the laser beam 20 (see FIG. 1) for creating the melt pool 16 may have a different frequency than the laser beam 24 for creating the splash 28. These individual frequencies may be selected to provide optimally efficient operation of the laser beams 20 and 24 in the formation of their respective features. For example, laser beam 20 could be of optimum frequency for coupling with a solid surface while laser beam 24 could be of optimum frequency for coupling with a melted surface to cause the splash. Further, the laser beams 20 and 24 may have different "on" durations (i.e., lasing durations) for forming their respective features.

In the preceding detailed description, various specific details are set forth in order to provide a thorough understanding of the invention and its various embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components that would be well-understood by one skilled in the art have not been described in detail to avoid unnecessary and burdensome explanation.

Furthermore, various operations have been described as multiple discrete steps performed in a manner that is helpful for understanding embodiments of the present invention. However, the order of description should not be construed to infer that these operations must be performed in the order they are presented, nor that they are even order-dependent unless otherwise so described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated. Accordingly, it is intended that the invention be limited only by the spirit and scope of the appended claims.

The invention claimed is:

1. A method comprising:
    propagating, via a first laser beam, a first laser energy through a first fiber of a multi-core fiber;
    propagating, via a non-laser energy source a second non-laser energy selected from one of a mechanical energy, sonic energy, and ultrasonic energy within a hollow second fiber of the multi-core fiber;
    applying the first laser energy to a surface of a substrate to form a liquefied bed on the surface;
    applying the second non-laser energy to at least a portion of the liquefied bed to cause a splash of liquefied material outside the liquefied bed; and
    forming on or above the surface of the substrate a three-dimensional anchoring structure upon solidification of the splash of liquefied material.

2. The method of claim 1, wherein the three-dimensional anchoring structure comprises at least one of a hook, a finger and a wave.

3. The method of claim 1, wherein the steps of applying the first laser energy comprises scanning the first laser beams relative to the surface of the substrate.

4. The method of claim 1, wherein the step of applying the second non-laser energy is performed during the step of applying the first laser energy.

5. The method of claim 1, wherein the first laser energy is continuous laser or pulsed.

6. The method of claim 1, further comprising providing one of an inert gas, a reactive gas, or vacuum conditions surrounding the surface during the applying steps.

7. The method of claim 1, further comprising applying a flux to the surface prior to the step of applying the first laser energy to the surface.

8. The method of claim 1, wherein the second energy is a mechanical energy comprising a burst of air.

9. The method of claim 1, wherein the second energy is a mechanical energy comprising a solid object having a size less than a diameter of the hollow second fiber.

10. The method of claim 9, wherein the solid object is a wire.

11. The method of claim 1, wherein the first laser energy is controlled to cause melting of the surface to a selected depth.

12. The method of claim 1, wherein the substrate comprises a gas turbine vane or blade, and wherein the method further comprises forming the anchoring structure in a bond coating layer or a ceramic thermal barrier coating layer of the substrate.

13. A method comprising:
    applying laser energy, via a laser energy beam, through an annular region of a multi core fiber to a surface of a solid material to form a liquefied bed on the surface of the solid material;
    applying a pulse of non-laser energy, via a non-laser energy source selected from one of a mechanical, sonic, and ultrasonic energy, within a hollow inner core region of the multi-core fiber to cause a disruption in at least a portion of the liquefied bed; and
    allowing the disruption to solidify on the surface of the solid material to form an anchoring structure.

14. The method of claim 13, wherein the anchoring structure comprises at least one of a hook, a finger and a wave.

15. The method of claim 13, wherein the laser energy beam is continuous or pulsed, and the disruption comprises a splash of liquefied material outside the liquefied bed.

16. The method of claim 13, wherein the non-laser energy source is mechanical and the pulse of non-laser energy comprises a burst of air or a solid object configured to travel within the hollow inner core region.

17. A method comprising:
    providing a first laser energy source and a second non-laser energy sources;
    delivering a pattern of energy from the first source by scanning a surface of a solid material to create a moving pool of liquefied material which re-solidifies along a trailing edge, the energy from the first source delivered through an annular region of a multi-core fiber; and
    repeatedly impacting the pool of liquefied material with pulses of non-laser energy from the second non-laser energy source to create a respective plurality of anchoring structures across the surface as the pool moves and the surface re-solidifies, the energy from the second source delivered within a hollow inner region of the multi-core fiber.

18. The method of claim 17, wherein the solid material is a bond coat of a thermal barrier coating system, and further comprising controlling the pattern of energy from the first energy source such that a depth of the moving pool is less than a thickness of the bond coat.

19. The method of claim 17, wherein the second non-laser energy sources is selected from one of mechanical, sonic, and ultrasonic energy sources.

20. The method of claim 19, wherein the second non-laser energy source is mechanical and the pulses of non-laser energy comprises a burst of air or a solid object sized less than a diameter of the hollow inner region of the multi-core fiber.

* * * * *